(12) United States Patent
Velappan et al.

(10) Patent No.: US 10,997,795 B2
(45) Date of Patent: May 4, 2021

(54) METHOD AND APPARATUS FOR PROCESSING THREE DIMENSIONAL OBJECT IMAGE USING POINT CLOUD DATA

(71) Applicant: Samsung Electronics Co., Ltd., Gyeonggi-do (KR)

(72) Inventors: Raghavan Velappan, Bangalore (IN); Suresh Kumar KrishnanKutty Vettukuzhyparambhil, Kerala (IN); Pavan Kumar Dusi, Bangalore (IN); Raghavendra Holla, Bengalur (IN); Amit Yadav, Bangalore (IN); Nachiketa Das, Bangalore (IN); Divyanshu Chuchra, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/409,243

(22) Filed: May 10, 2019

(65) Prior Publication Data
US 2019/0347867 A1 Nov. 14, 2019

(30) Foreign Application Priority Data

May 10, 2018 (IN) .......... 201841017679 PS
Apr. 30, 2019 (IN) .......... 201841017679 CS

(51) Int. Cl.
*G06T 19/20* (2011.01)
*G06T 7/90* (2017.01)
(Continued)

(52) U.S. Cl.
CPC .......... *G06T 19/20* (2013.01); *G06T 7/60* (2013.01); *G06T 7/90* (2017.01); *G06T 9/00* (2013.01);
(Continued)

(58) Field of Classification Search
None
See application file for complete search history.

(56) References Cited

U.S. PATENT DOCUMENTS 9,530,225 B1 12/2016 Nieves
2003/0038798 A1* 2/2003 Besl .............. G06T 15/205
345/420

(Continued)

FOREIGN PATENT DOCUMENTS

KR 10-0897006 5/2009
KR 1020110120317 11/2011
(Continued)

OTHER PUBLICATIONS

Tim Golla, Reinhard Klein, "Real-time Point Cloud Compression", Oct. 2, 2015, IEEE, 2015 IEEE/RSJ International Conference on Intelligent Robots and Systems (IROS), pp. 5087-5092.*

(Continued)

*Primary Examiner* — Robert Bader
(74) *Attorney, Agent, or Firm* — The Farrell Law Firm, P.C.

(57) ABSTRACT

An apparatus and method are provided for compressing a three-dimensional (3D) object image represented by point cloud data. The method includes positioning the 3D object image into a plurality of equi-sized cubes for compression; determining 3D local coordinates in each of the plurality of equi-sized cubes and a cube index for each point of the 3D object image positioned in the plurality of equi-sized cubes; generating two-dimensional (2D) image data based on the 3D local coordinates and the cube indexes; and storing the 2D image data in a memory. The 2D image data includes at least one of 2D geometry data, 2D meta data, or 2D color data.

15 Claims, 15 Drawing Sheets

(51) Int. Cl.
*G06T 7/60* (2017.01)
*G06T 15/08* (2011.01)
*G06T 9/00* (2006.01)

(52) U.S. Cl.
CPC .... *G06T 15/08* (2013.01); *G06T 2207/10028* (2013.01)

(56) References Cited

U.S. PATENT DOCUMENTS

| | | | |
|---|---|---|---|
| 2003/0214502 | A1* | 11/2003 | Park .............. G06T 17/005 345/420 |
| 2010/0209013 | A1 | 8/2010 | Minear et al. |
| 2018/0122129 | A1 | 5/2018 | Peterson et al. |
| 2019/0108656 | A1* | 4/2019 | Sugio .................. G06T 9/40 |
| 2020/0143568 | A1* | 5/2020 | Lasserre ............... G06T 9/40 |

FOREIGN PATENT DOCUMENTS

| | | |
|---|---|---|
| KR | 1020150089364 | 8/2015 |
| WO | WO 2017/157967 | 9/2017 |

OTHER PUBLICATIONS

Abu Saleh Mohammad Mosa, Bianca Schön, Michela Bertolotto, Debra F. Laefer, "Evaluating the Benefits of Octree-based Indexing for Lidar Data", Sep. 2012, American Society for Photogrammetry and Remote Sensing, Photogrammatic Engineering & Remote Sensing, vol. 78, No. 9, pp. 927-934.*

Dan Dolonius, Erik Sintorn, Viktor Kampe, Ulf Assarsson, "Compressing Color Data for Voxelized Surface Geometry", ACM, Feb. 27, 2017, I3D '17: Proceedings of the 21st ACM SIGGRAPH Symposium on Interactive 3D Graphics and Games, pp. 1-10.*

Leonid Levkovich-Maslyuk, Alexey Ignatenko, Alexander Zhirkov, Anton Konushin, In Kyu Park, Mahnjin Han, Yuri Bayakovski, "Depth Image-Based Representation and Compression for Static and Animated 3-D Objects", Jul. 2005, IEEE Transactions on Circuits and Systems for Video Technology, vol. 14, No. 7, pp. 1032-1045.*

International Search Report dated Aug. 29, 2019 issued in counterpart application No. PCT/KR2019/005655, 10 pages.

* cited by examiner

FIG. 1A
FIG. 1B
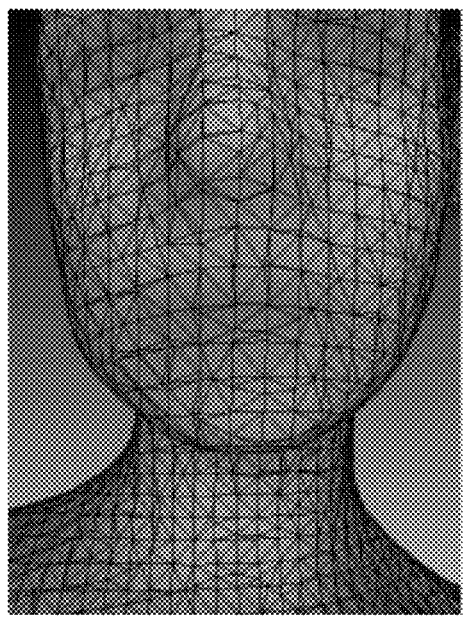
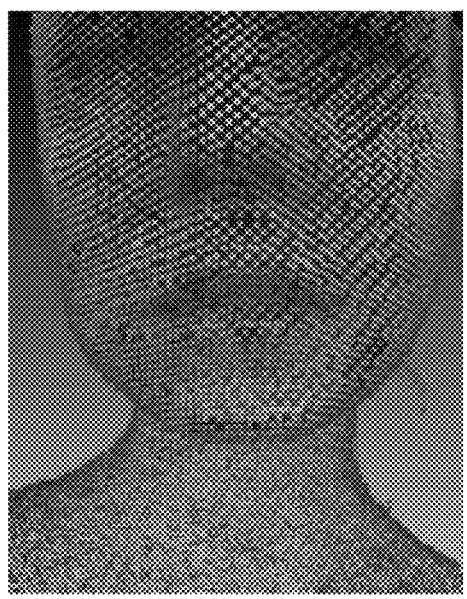

FIG. 12
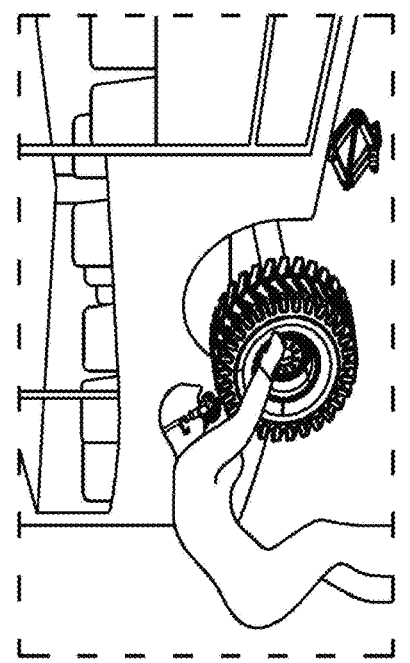
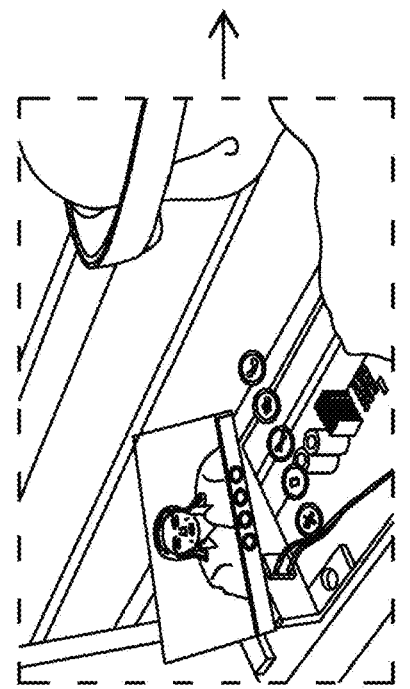
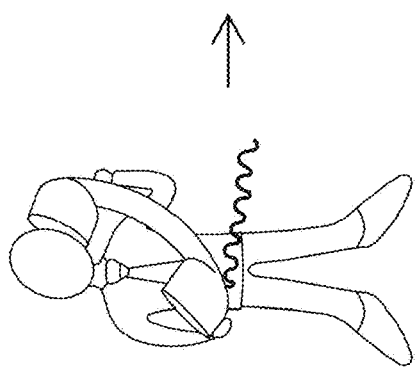

US 10,997,795 B2

METHOD AND APPARATUS FOR PROCESSING THREE DIMENSIONAL OBJECT IMAGE USING POINT CLOUD DATA

CROSS-REFERENCE TO RELATED APPLICATIONS

The application is based on and claims priority under 35 U.S.C. § 119 to Indian Provisional Application No. 201841017679 (PS), which was filed in the Indian Intellectual Property Office on May 10, 2018, and Indian Complete Application No. 201841017679 (CS), which was filed in the Indian Intellectual Property Office filed on Apr. 30, 2019, the entire disclosure of each of which is incorporated herein by reference.

BACKGROUND

1. Field

The disclosure relates generally to a data processing system, and more particularly, to a method and system for handling a three-dimensional (3D) model using volumetric point-cloud data for real time rendering.

2. Description of Related Art

In general, volumetric point cloud data is very large in size. Volumetric point cloud data is a collection of three-dimensional spatial points, representing a visible surface of an object (e.g., an image, a video, etc.).

Although many conventional methods and systems have been proposed for handling a 3D model created using volumetric point-cloud data, these conventional methods and systems have disadvantages regarding power consumption, robustness, reliability, integrity issues, operation dependency, time, cost, complexity, design, hardware components used, size, a decompression time, real-time rendering, etc.

Thus, it is desired to address the aforementioned disadvantages or other shortcomings and/or provide a useful alternative.

SUMMARY

An aspect of the disclosure is to address at least the above-mentioned problems and/or disadvantages and to provide at least the advantages described below.

In accordance with an aspect of the disclosure, a compression method is provided for a 3D object image represented by point cloud data. The method includes positioning the 3D object image into a plurality of equi-sized cubes for compression; determining 3D local coordinates in each of the plurality of equi-sized cubes and a cube index for each point of the 3D object image positioned in the plurality of equi-sized cubes; generating two-dimensional (2D) image data based on the 3D local coordinates and the cube indexes, wherein the 2D image data includes at least one of 2D geometry data, 2D meta data, or 2D color data; and storing the 2D image data in a memory.

In accordance with another aspect of the disclosure, an electronic device is provided for handling a 3D model using point-cloud data. The electronic device includes a processor coupled with a memory. The processor is configured to position a 3D model to be compressed into a plurality of equi-sized cubes, determine a local coordinate and a cube index for each point of the 3D model with reference to the equi-sized cubes, and generate a plurality of 2D images based on the 3D local co-ordinates and the cube indexes. The 2D images represent at least one of a geometry of the 3D model, a metadata of the 3D model, and a color of the 3D model.

In accordance with another aspect of the disclosure, a non-transitory computer-readable recording medium having an executable program recorded thereon is provided, wherein the program, when executed by at least one processor, instructs a computer to perform positioning the 3D object image into a plurality of equi-sized cubes for compression; determining 3D local coordinates in each of the plurality of equi-sized cubes and a cube index for each point of the 3D object image positioned in the plurality of equi-sized cubes; generating two-dimensional (2D) image data based on the 3D local coordinates and the cube indexes, wherein the 2D image data comprises at least one of 2D geometry data, 2D meta data, or 2D color data; and storing the 2D image data in a memory.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 1A illustrates an example of 3D mesh image content;

FIG. 1B illustrates an example of point cloud in an image;

FIG. 12 illustrates an electronic device providing volumetric video for mixed reality (MR) based training, according to an embodiment.

DETAILED DESCRIPTION OF DISCLOSURE

Figure 2:
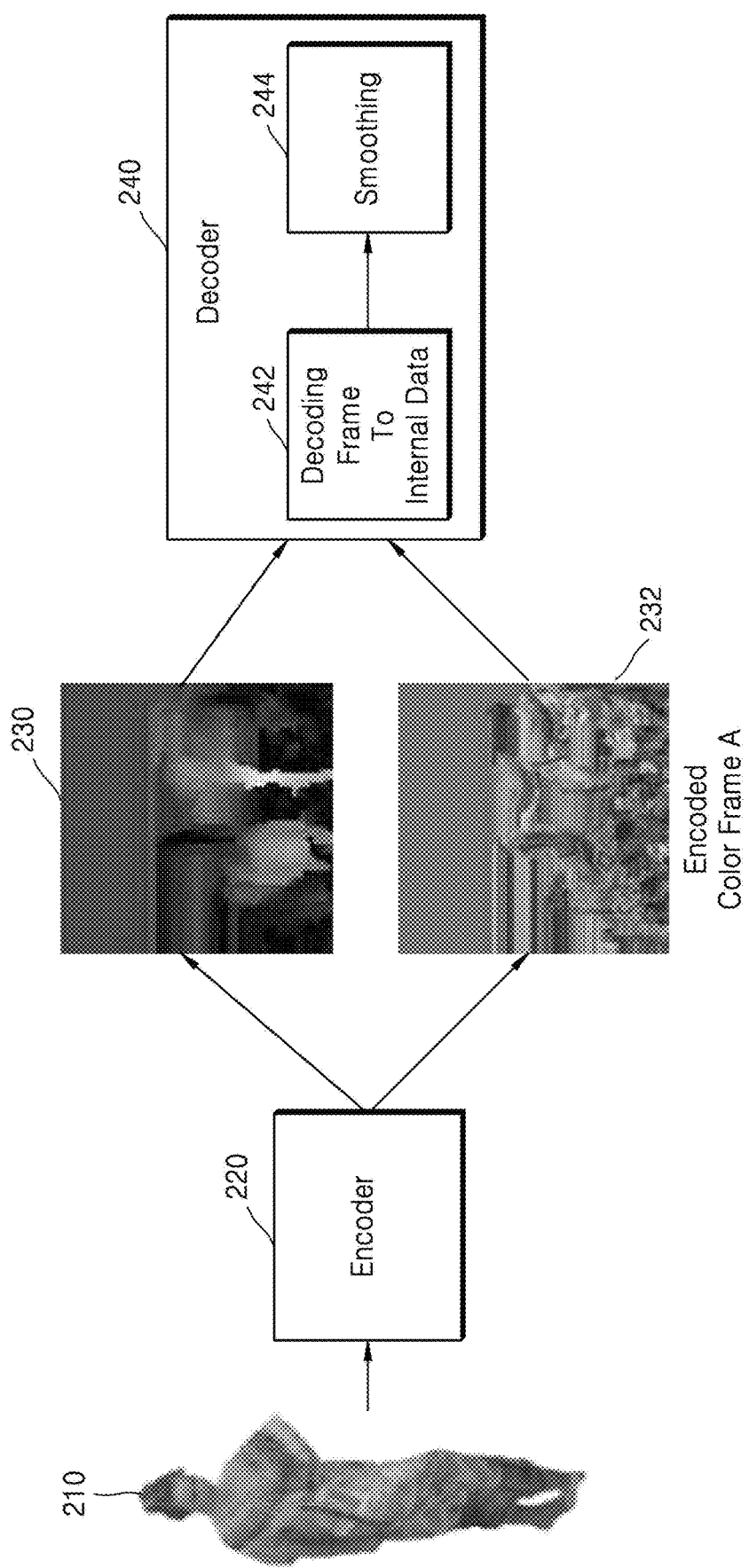
FIG. 2 illustrates a moving pictures expert group (MPEG) test model category 2 (TMC2) procedure, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, modules, etc., are physically implemented by analog or digital circuits such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc., may be used herein to describe various elements, these elements should not be limited by these terms. These terms are generally used to distinguish one element from another.

In accordance with an aspect of the disclosure, a method is provided for handling a 3D model using point-cloud data. The method includes positioning, by an electronic device, a 3D model to be compressed into a plurality of equi-sized cubes; determining, by the electronic device, a local co-ordinate and a cube index for each point of the 3D model with reference to each equi-sized cubes; and generating, by the electronic device, a plurality of two-dimensional (2D) images based on the local coordinate and the cube index. The 2D images represent at least one of geometry of the 3D model, a metadata of the 3D model, and a color of the 3D model.

The method may be used to compress and decompress the 3D model using volumetric point cloud data for real time rendering in an effective manner. In the method, a graphical processing unit (GPU) based decompression scheme provides real time decoding and rendering and optimized compression schemes from a high efficiency video coding/joint photographic experts group/portable network graphics (HEVC/JPEG/PNG) are used for an efficient 3D to 2D projection. A global to local coordinate transformation is performed and the same is projected into a raw buffer. The raw buffer is compressed with HEVC/JPEG/PNG techniques. Alternatively, adaptive scalable texture compression (ASTC) compression can be used.

The method may be used to efficiently compress data with a GPU based decompression and to achieve a play back of a point cloud data video in real time. The method provides better geometry and color peak signal to noise ratio (PSNR) values. The method may be used to perform better compression and decompression and render the 3D model in real-time.

Further, the method may be used for standardizing a compression scheme with a MPEG standardization body. Further, the method may be implemented in an AR domain, a virtual reality (VR) domain, and an MR domain.

The method may be used to provide a GPU based decompression scheme for a real time decoding and rendering procedure. The method may also be used to optimize compression schemes from HEVC/PNG/JPEG to use for an efficient 3D to 2D projection. The method may be used to achieve a real-time performance by leveraging video hardware for decoding and using a GPU for real-time rendering.

The method considers volumetric textures as input and efficiently decodes 2D data to a 3D volumetric model in real-time. In the method, all of the operations at each vertex are independent from other vertex operations. The GPU may be used to parallelize all of these operations and achieve real-time rendering.

The method provides better compression rate. The method encodes the input 3D point cloud into a GPU compatible novel texture, referred to as a "volumetric texture".

In the method, the electronic device executes the decompression and rendering entirely on the GPU, and the electronic device may render a large size volumetric point cloud in real-time.

The method may be implemented in various fields (e.g., an education field, a tourism field, a fashion field, a military field, a 3D video call technology, a sports field, etc.).

A mesh is a collection of vertices, edges, and faces that describe a shape of a 3D object in image content.

FIG. 1A illustrates an example of a 3D mesh image.

Referring to FIG. 1A, a 3D mesh image of a face consists of triangles. Alternatively, the mesh may consist of different shapes, such as rectangular, quadrilateral or simple convex polygons. The 3D mesh image may be generated using 3D modeling software tool such as computer-aided design (CAD), geographic information system (GIS), Blender™, or SketchUp™.

FIG. 1B illustrates an example of point clouds in an image.

Referring to FIG. 1B, point clouds are a collection of points that represent a 3D shape or feature in image content. Each point in the point clouds has its own attributes, which include a vertex, a color, normal, etc. Likewise, volumetric point cloud data is a collection of 3D spatial points that represent a visible surface of an object (e.g., an image, a video, etc.).

Generally, in order to capture 3D point clouds, a 3D scanning setup is made with range based scanners and camera projectors, and a real object to be captured is placed in this 3D scanning setup.

The 3D point cloud data, however, requires a large amount of storage space. The size of a 200K point model will have approximately 1.3 MB data per frame. For 30 frames/second, the data size will be 39 Mega Bytes (1.3*30=39 MB), which is equivalent to 39*8=312 Mega Bits. For a network with a bandwidth of 20 Mbps (Megabits per second), the 312 MB data need to be compressed to 20 MB data, which is approximately 15 times smaller than original data size, to achieve 30 frames per second.

As indicated above, volumetric video content has a large amount of data. In order to successfully stream and play back the volumetric point cloud data in real-time, a system demands a compression procedure that can provide a compression rate sufficient to stream the volumetric video content smoothly over a standard network connections (e.g., a $4^{th}$ generation (4G) connection, a $5^{th}$ generation (5G) connection, etc.) as well as a decoding process which is fast enough to decode and render the volumetric video content in real-time.

For example, each 3D point of an object in an image has geometry (X, Y, and Z) and color information (R, G, B). For 10 bit quantized geometry, each of the X, Y, and Z coordinates uses 10 bits, each vertex (x, y, z) uses 10*3=30 bits, each vertex color is represented by RGB, each R, G, and B channel uses 8 bits, each vertex uses 3*8=24 bits, and each vertex (xyz+RGB) uses 30+24=54 bits. The system may calculate a memory required for each frame (i.e., number of vertices in each frame=200K, memory per frame=200K*54=10800 Kbits=~1.3 MB, and the memory required for stream of 30 frames equals 30*1.3 MB=39 MB). 30 frames per second (FPS) rendering indicates that 30 frames are required for playing 1 second video. The memory required for playing longer duration may be very high, which results in high compression of input data at a host side and less decompression time at a rendering side for playing stream of point clouds with minimum 30 FPS.

Various existing methods utilize a 3D to 2D projection that creates irregular patches, and therefore, needs to encode a shape of the patch as well. The existing methods can be used to encode the patch as a binary occupancy map, which undergoes a lossless compression. A major bottle neck in the existing methods is decoding data in real-time, apart from that a reconstructed model needs a post processing operation of 'smoothing', which takes a few seconds to finish, even on a personal computer (PC) platform. Even when these techniques are serially performed, the whole process of compression and decompression cannot be accelerated by a hardware alone.

Further, although the existing methods may be able to achieve a better compression rate, since decoding cannot be performed in real-time, a larger bandwidth should still be used during a streaming scenario.

FIG. 2 illustrates an MPEG TMC2 procedure, according to an embodiment.

Referring to FIG. 2, an input model 210 is projected onto 6 planes of a bounding cube. Geometry and color information data are encoded into 2 textures 230 and 232 Further, an encoding process involves complex steps or operations like projection onto planes, clustering, and occupancy map generation. Due to multiple steps or operations in the methods, input data losses may occur. Further, a decoding process by a decoder 240 is complex and computation intensive. In operation 242, two encoded textures may be decoded to internal data. Further, a smoothing operation 244 is used to compensate the loss of data. Since the smoothing operation cannot use a GPU, the whole decoding algorithm is far from GPU-friendly.

Figure 3A:
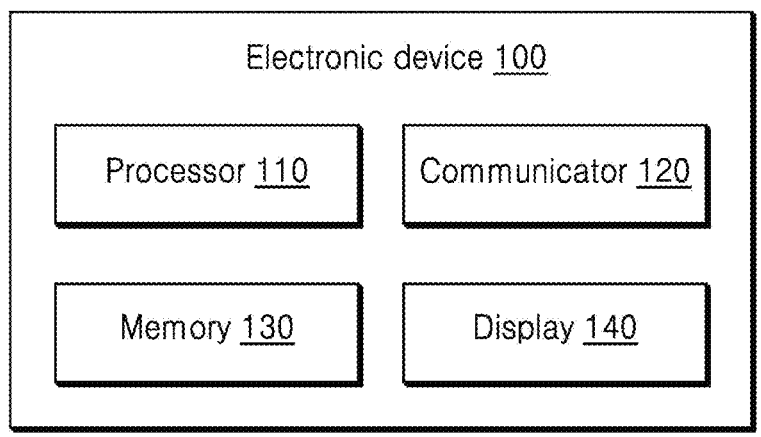
FIG. 3A illustrates an electronic device for compressing a 3D model using point-cloud data, according to an embodiment.

FIG. 3A illustrates an electronic device for compressing a 3D model using point-cloud data, according to an embodiment.

Referring to FIG. 3A, an electronic device 100 may be a cellular phone, a smart phone, a Personal Digital Assistant (PDA), a tablet computer, a laptop computer, a video player, virtual reality device, a mixed reality device, an augmented reality device, a camera, etc. Point-cloud data may also be referred to as three dimensional spatial point data.

The electronic device 100 includes a processor 110 (e.g., a GPU), a communicator 120, a memory 130, and a display 140. The processor 110 may position a 3D model to be compressed into a plurality of equi-sized cubes. The 3D model includes a plurality of 3D points (i.e., vertices), and each of 3D points is represented using a geometry and color coordinates. The 3D model to be compressed into the plurality of equi-sized cubes is positioned by receiving an input 3D model with geometry and color coordinates. The geometry corresponds to global 3D coordinates.

The equi-sized cubes may be generated based on a maximum boundary of a color format. For example, the maximum boundary may be 8 bits for the RGB color format.

After positioning the 3D model to be compressed into the plurality of equi-sized cubes, the processor 110 may determine a local coordinate and a cube index for each point of the 3D model with reference to the equi-sized cubes. The local coordinate and the cube index for each point of the 3D model with reference to the equi-sized cubes may be determined by transforming the geometry available in the equi-sized cubes.

Further, the processor 110 may generate a plurality of 2D images based on the local coordinate and the cube index. The 2D images represent at least one of the geometry of the 3D model, a metadata of the 3D model, and a color of the 3D model.

The geometry represents the local-coordinates of all the points of the 3D model, the metadata represents the cube index, and the color represents color information of all the points of the 3D model.

The communicator 120 may communicate with internal hardware components and/or with external devices via one or more networks. Further, the communicator 120 may communicate with the electronic device 100.

The display 140 may display the 2D images.

The memory 130 may store a plurality of 2D images based on the local coordinate and the cube index. The memory 130 may store instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may be considered a non-transitory storage medium. The term "non-transitory" may indicate that the storage medium is not embodied in a carrier wave or a propagated signal. However, the term "non-transitory" should not be interpreted that the memory 130 is non-movable.

The memory 130 may be configured to store large amounts of information. A non-transitory storage medium may store data that can, over time, change (e.g., in a random access memory (RAM) or cache).

Although the FIG. 3A illustrates various hardware components of the electronic device 100, the disclosure is not limited thereto. In other embodiments, the electronic device 100 may include fewer or more components. Further, the labels or names of the components in FIG. 3A are used only for illustrative purpose and do not limit the scope of the disclosure. One or more components can be combined together to perform the same or substantially similar function to compress the 3D model using the point-cloud data.

Figure 3B:
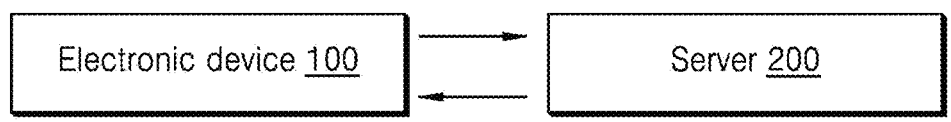
FIG. 3B illustrates a system for compressing a 3D model using point-cloud data, according to an embodiment.

FIG. 3B illustrates a system for compressing a 3D model using point-cloud data, according to an embodiment.

Referring to FIG. 3B, the system includes the electronic device 100, as described above with reference to FIG. 3A, and a server 200.

After generating the plurality of 2D images, the electronic device 100 transmits the plurality of 2D images to the server 200. The server 200 renders the plurality of 2D images in another electronic device.

Alternatively, the electronic device 100 may compress and store the dynamic 3D models in the server 200. Further, the server 200 may send the dynamic 3D models to a client application executed in another electronic device and render the dynamic 3D models in real time.

Figure 4:
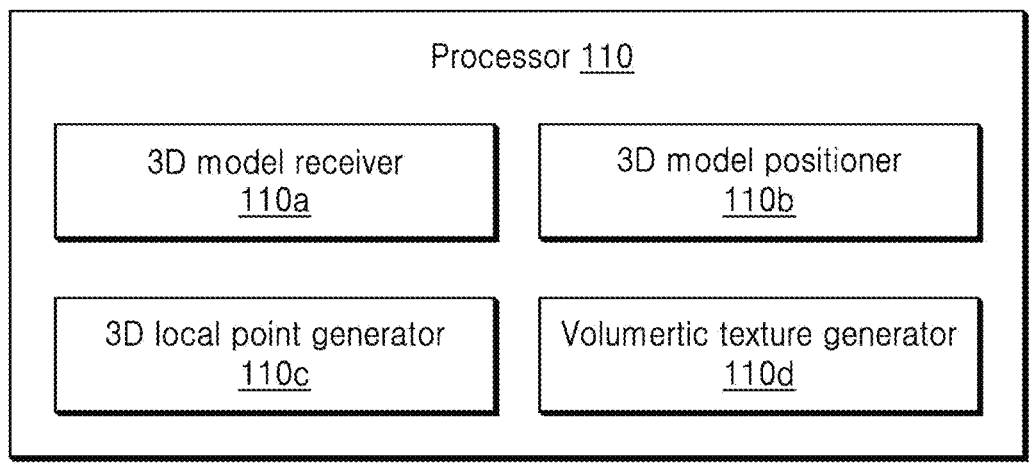
FIG. 4 illustrates a processor for compressing a 3D model using point-cloud data, according to an embodiment.

FIG. 4 illustrates a processor for compressing a 3D model using point-cloud data, according to an embodiment.

Referring to FIG. 4, the processor 110 includes a 3D model receiver 110a, a 3D model positioner 110b, a 3D local point generator 110c, and a volumetric texture generator 110d.

The 3D model receiver 110a receives the input 3D model with the geometry and color coordinates. After receiving the input 3D model, the 3D model positioner 110b positions the 3D model to be compressed into the plurality of equi-sized cubes.

After positioning the 3D model to be compressed into the plurality of equi-sized cubes, the 3D local point generator 110c determines the local coordinate and the cube index for each point of the 3D model with reference to the equi-sized cubes.

Further, the volumetric texture generator 110d generates the plurality of 2D images based on the local co-ordinate and the cube index, wherein the 2D images represent at least one of the geometry of the 3D model, the metadata of the 3D model, and the color of the 3D model.

Figure 5A:
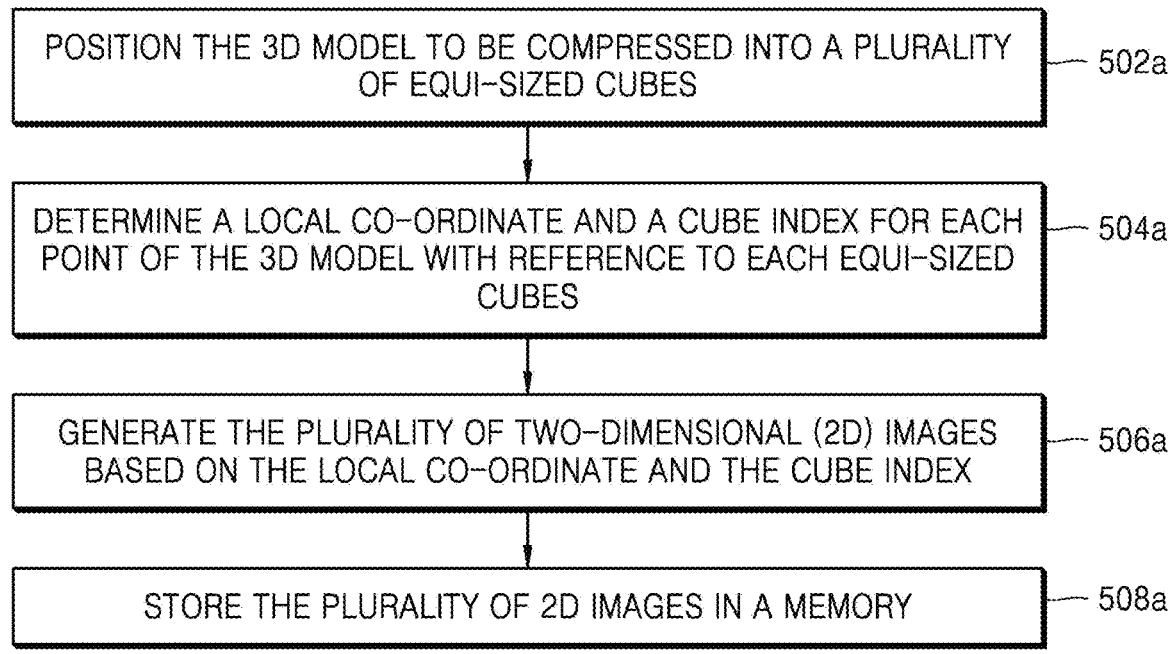
FIG. 5A is a flowchart illustrating a procedure for compressing a 3D model using point-cloud data, according to an embodiment.

FIG. 5A is a flowchart illustrating a procedure for compressing a 3D model using point-cloud data, according to an embodiment.

Referring to FIG. 5A, the illustrated procedure may be performed by the processor 110 of the electronic device 100. The processor 110 may be coupled with an encoder to perform all the operations.

In operation 502a, the processor 110 positions the 3D model to be compressed into the plurality of equi-sized cubes.

In operation 504a, the processor 110 determines a local coordinate and a cube index for each point of the 3D model with reference to each equi-sized cubes.

In operation 506a, the processor 110 generates a plurality of 2D images based on the local coordinate and the cube index.

In operation 508a, the processor 110 stores the plurality of 2D images in the memory 130.

Figure 5B:
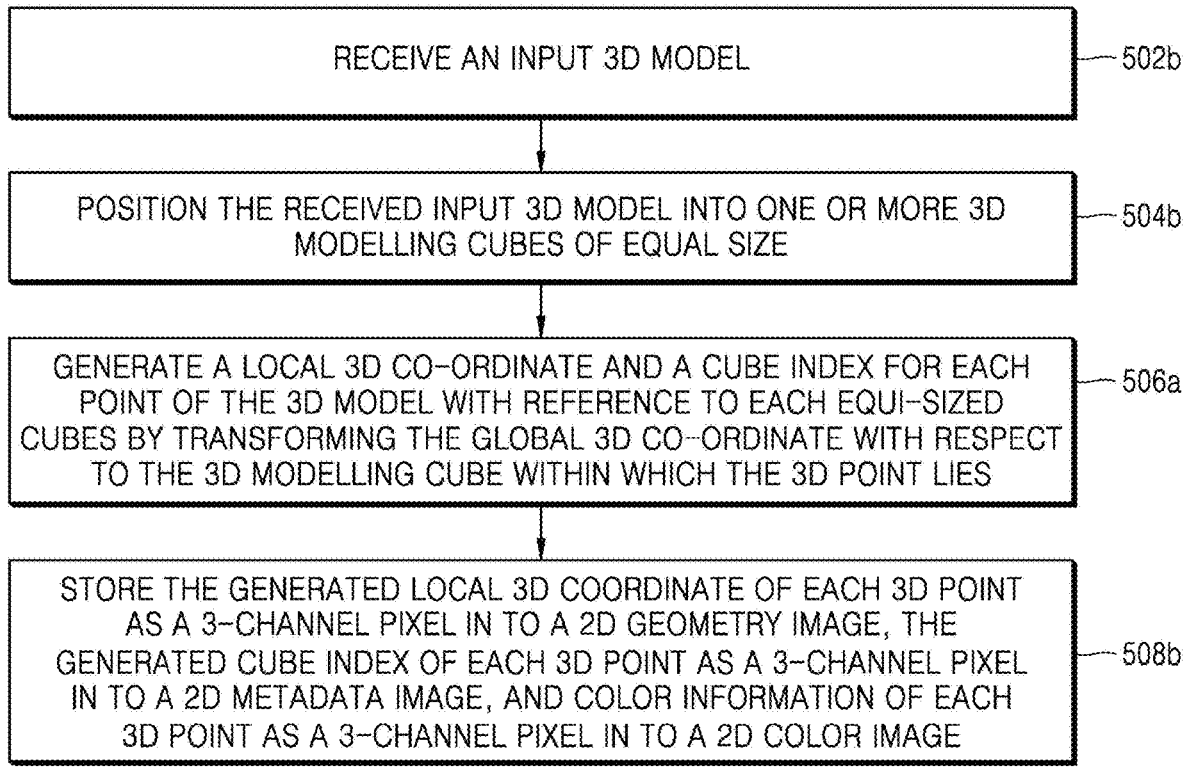
FIG. 5B is a flowchart illustrating a procedure for compressing a 3D model using point-cloud data, according to an embodiment.

FIG. 5B is a flowchart illustrating a procedure for compressing a 3D model using point-cloud data, according to an embodiment.

Referring to FIG. 5B, the illustrated procedure may be performed by the processor 110.

In operation 502b, the processor 110 receives the input 3D model. The input 3D model includes the plurality of 3D points. Each of 3D point is represented using global 3D coordinates and color information.

In operation 504b, the processor 110 positions the received input 3D model into one or more equal size 3D modeling cubes of equal size. The size of each of the equal size 3D modeling cubes is determined based on a boundary of a color format.

In operation 506b, the processor 110 generates the local 3D co-ordinate and the cube index for each point of the 3D model with reference to each of equi-sized cubes by transforming the global 3D co-ordinates with respect to the equal size 3D modeling cube within which the 3D point lies.

In operation 508b, the processor 110 stores the generated local 3D coordinates of each 3D point as the 3-channel pixel in the 2D geometry image, the generated cube index of each 3D point as the 3-channel pixel in to the 2D metadata image, and color information of each 3D point as the 3-channel pixel in the 2D color image.

The various actions, acts, blocks, operations, steps, etc., in FIGS. 5A and 5B may be performed in the order presented, in a different order, or simultaneously. Further, in some embodiments, some of the actions, acts, blocks, steps, etc., may be omitted, added, modified, skipped, etc., without departing from the scope of the disclosure.

Figure 6A:
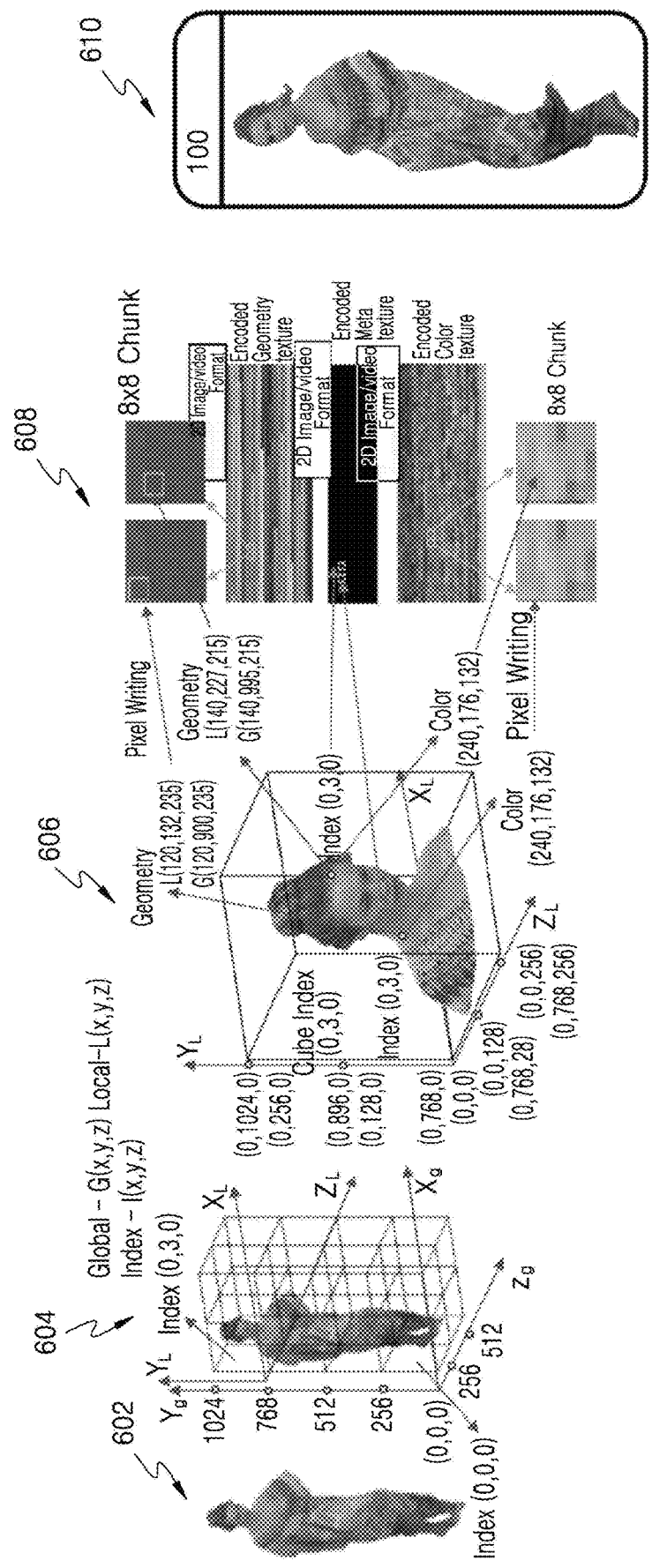
FIG. 6A illustrates an electronic device compressing a 3D model using point-cloud data, according to an embodiment.
Figure 6B:
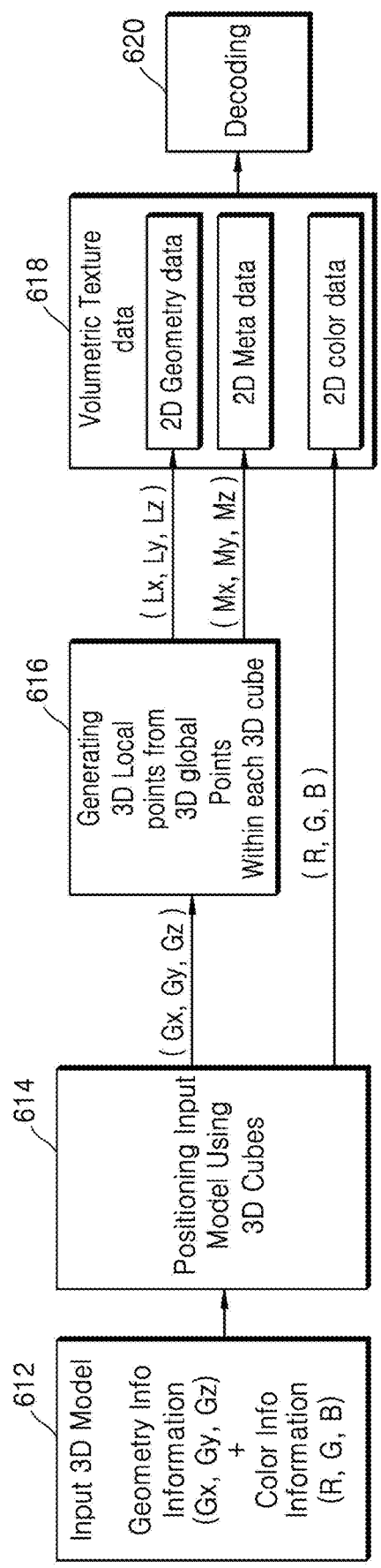
FIG. 6B is a block diagram illustrating an electronic device compressing a 3D model using point-cloud data, according to an embodiment.

FIGS. 6A and 6B illustrate an electronic device compressing a 3D model using point-cloud data, according to an embodiment.

Referring to FIGS. 6A and 6B, in operations 602 and 612, the electronic device receives an input 3D model with geometry information (e.g., global 3D coordinates or global 3D points) and color coordinates—color information (R, G, B). The input 3D model may be a 3D object image and include point cloud data of the 3D object image captured with 3D scanning setup in a space.

In operations 604 and 614, the electronic device positions the received 3D model into one or more 3D modeling cubes of equal size. For example, if desired color coordinates for compression is (R, G, B), the size of the cube may be 256×256×256 (because any 3D local coordinate within the equal size cube can be represented using a 2D RGB image format such as PNG). Similarly, the cube size will be different for luma component (Y)-chrominance (UV) components (YUV) color space.

3D cube indexes (Mx, My, Mz) are also obtained. Each of the 3D cube indexes may represent the position of each cube used for positioning the input 3D model.

In operations 606 and 616, for each 3D modeling cube, local 3D coordinates (i.e., 3D local points (Lx, Ly, Lz)) are generated by transforming the global 3D co-ordinates (3D global points (Gx, Gy, Gz)) present in the 3D modeling cube (i.e., (0<=x, y, z<=255)). As the cube size is 256×256×256, any global coordinate is transformed in the range of (0, 0, 0)-(255, 255, 255). Further, there is no transformation on color data since color value is already in range of 0<=r, g, b<=255.

In operations 608 and 618, the electronic device generates volumetric texture data including the plurality of 2D images, based on the local 3D co-ordinate and the 3D cube index. The plurality of 2D images may include 2D geometry data, 2D meta data, and 2D color data each of which represents a geometry of the 3D model, the metadata of the 3D model, and the color of the 3D model, respectively. That is, each of 3D local points may be encoded as or mapped to a pixel in a 2D geometry image of the 2D geometry data with (x, y, z) as RGB channels of each pixel, color value (R, G, B) of each 3D co-ordinate may be encoded as or mapped to the 2D color data corresponding to 2D color image, and each of the 3D cube indexes may be encoded as or mapped to the 2D meta data. The plurality of 2D images may be stored in a memory 130 for further processing, such as decoding.

In operations 610 and 620, the electronic device decodes the volumetric texture data and reproduces the decoded 2D images on a display. The electronic device may receive the volumetric texture data as input and efficiently decode the volumetric texture data to a 3D volumetric data in real-time.

Table 1 below shows a comparison result regarding decoding time, compression rate and peak signal to noise ratio (PSNR) among the proposed method, MPEG TMC2 algorithm, and Draco algorithm.

TABLE 1

Comparison Result

| | Data with 200k cloud points | | |
|---|---|---|---|
| Comparison | Method in the disclosure | MPEG TMC2 | Draco |
| Decoding Time (ms) | 17.65 | 201005 | 729 |
| Compression Rate (BPV) | 12.86 | 0.90 | 18.1 |
| PSNR (dB) | Lossless | 55 | 52 |

As shown in Table 1 above, the method has only a 17.65 ms decoding time, whereas MPEG TMC 2 and Draco require 201005 ms and 729 ms, respectively. In addition, the method in the disclosure shows no loss in PSNR.

Figure 7:
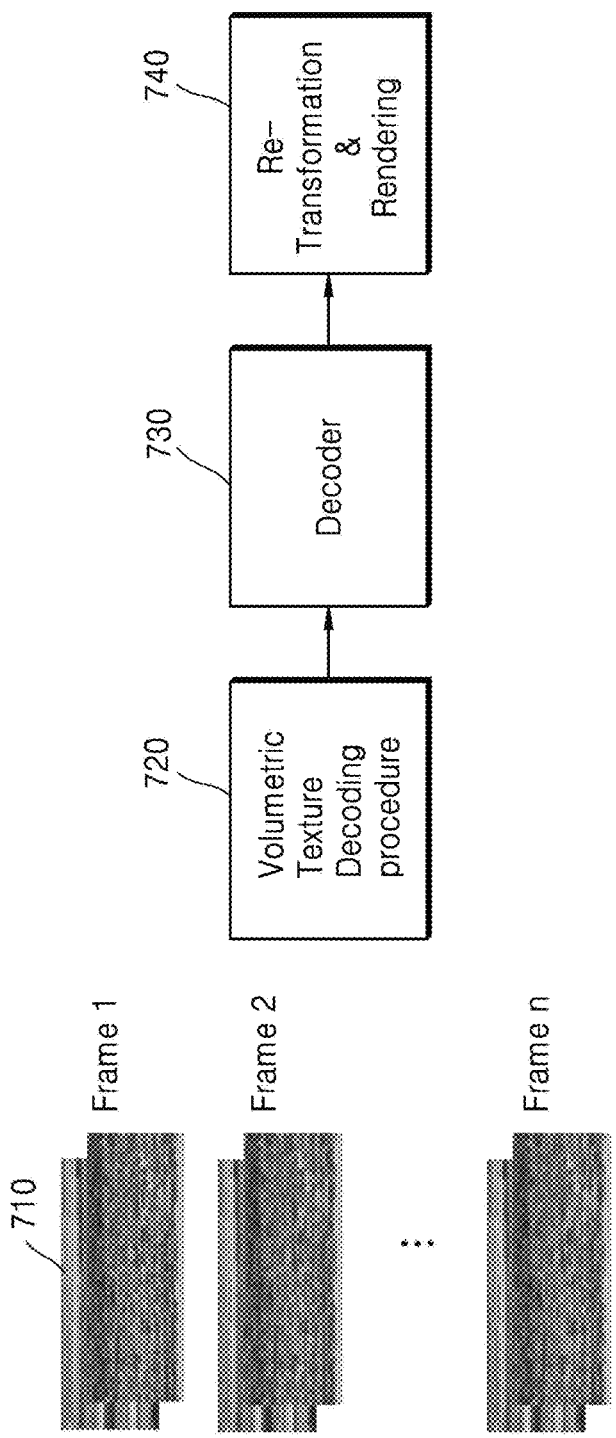
FIG. 7 illustrates an electronic device performing a decoding process, according to an embodiment.

FIG. 7 illustrates an electronic device performing a decoding process, according to an embodiment.

Referring to FIG. 7, the electronic device 100 decodes the encoded 2D quantized point data using a decompression procedure. Further, the electronic device 100 regenerates an 8 bit transform value in a rectangular grid for 3D projection using the local coordinates of each of sub-bounding boxes and transforms the local coordinates of each of the sub-bounding boxes into the global coordinates. Further, the electronic device 100 merges each sub-bounding boxes to form a bounding box for 3D projection. Further, the electronic device 100 renders 3D data corresponding to the bounding box. In FIG. 7, the bounding box of the point cloud data is divided into equi-sized cubes.

If decoding time on the client side is low, all the frames will be rendered properly in operation 710.

In operation 720, the electronic device 100 may initiate volumetric texture decoding procedure and achieve real time volumetric video streaming with efficient compression and rendering techniques.

In operation 730, volumetric textures (i.e., geometry and color co-ordinates) are transmitted to a decoder. The GPU will process input textures and transform 2D data to 3D data for rendering.

In operation 740, the GPU may perform re-projection and rending the decoded volumetric textures.

Figure 8:
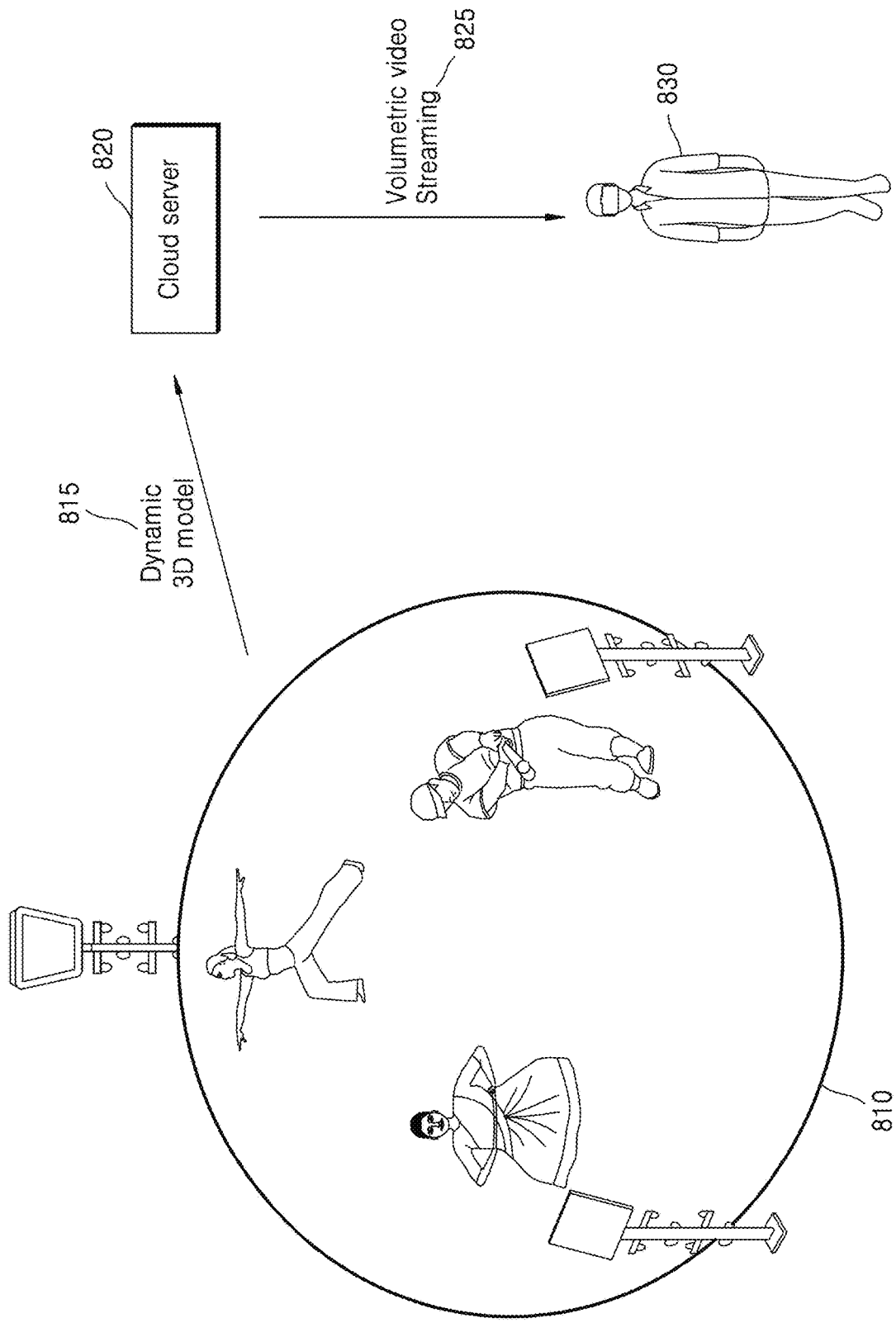
FIG. 8 illustrates an electronic device sharing dynamic 3D models, according to an embodiment.

FIG. 8 illustrates an electronic device sharing dynamic 3D models, according to an embodiment.

Referring to FIG. 8, in operation 810, the electronic device captures an activity (e.g., a dance, yoga, etc.).

In operation 820, the electronic device compresses and stores the dynamic 3D models 815 in a cloud server. The cloud server may transmit the dynamic 3D models to a client application executed in another electronic device and render the dynamic 3D models in real time.

In operation 830, the electronic device achieves real time volumetric video streaming 825 with efficient compression and rendering procedure.

Figure 9:
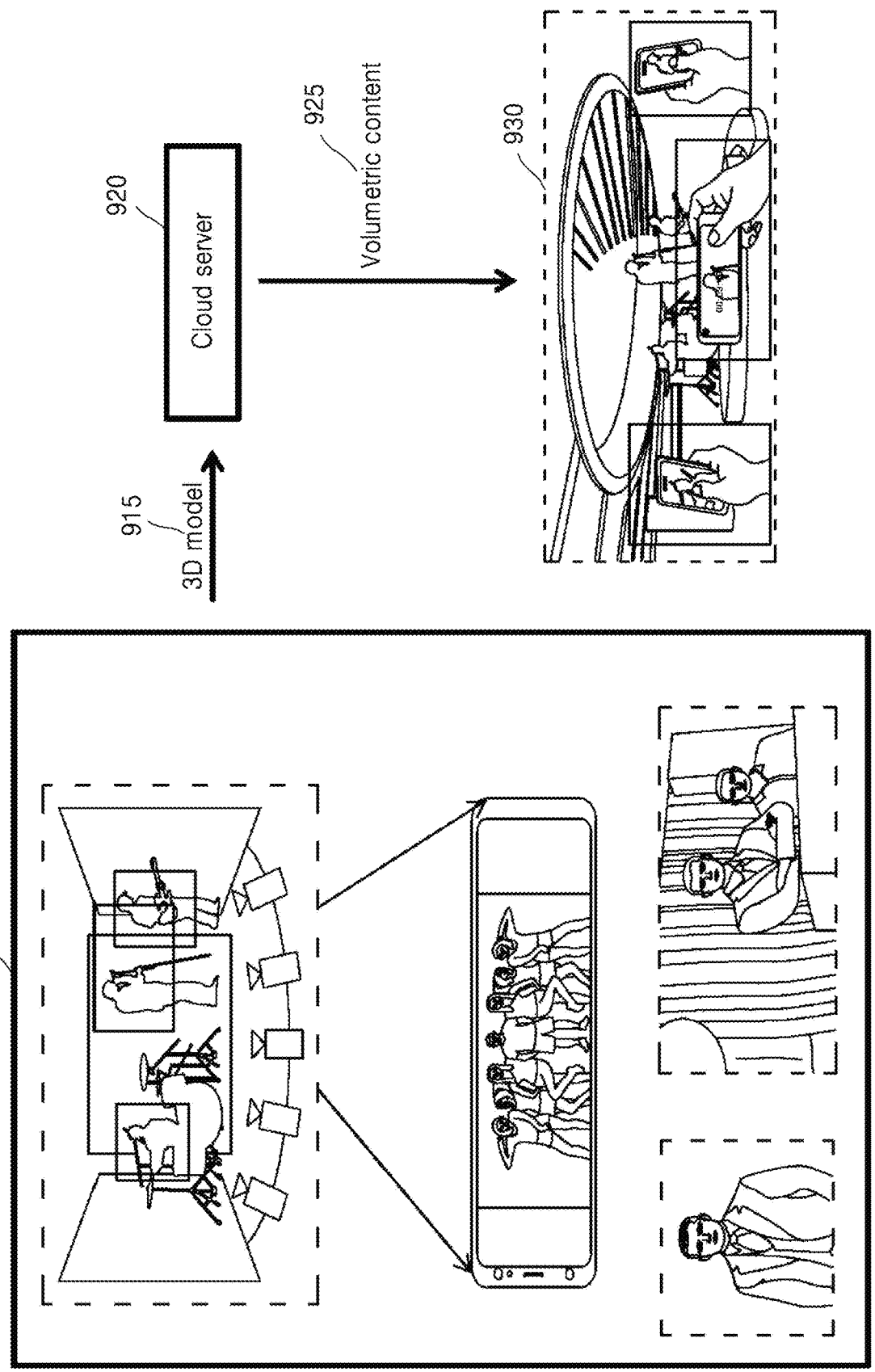
FIG. 9 illustrates an electronic device providing a volumetric video augmented reality (AR) service, according to an embodiment.

FIG. 9 illustrates an electronic device providing volumetric video AR service, according to an embodiment.

Referring to FIG. 9, a volumetric studio with an appropriate camera setup generates a 3D model 915 as volumetric video in operation 910.

In operation 920, the volumetric video is compressed and stored in the server or electronic device and the server sends the volumetric content 925, such as volumetric video, to a client application executed in another electronic device.

In operation 930, the client application, which allows the user to take selfie, downloads the volumetric content 925 in an on demand basis. The client application also has a decoder to decode and renders the volumetric content 925 along with camera content.

Figure 10:
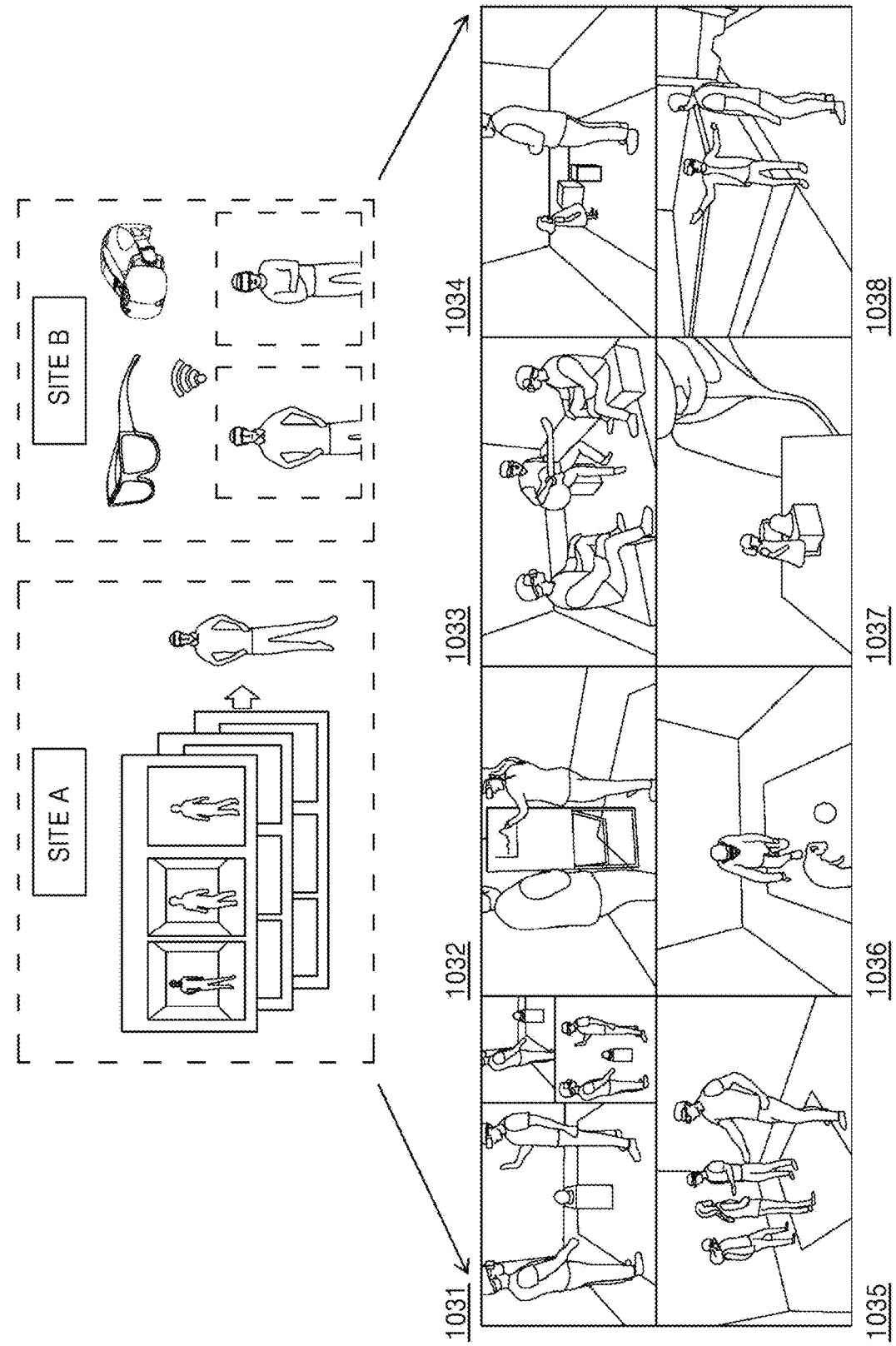
FIG. 10 illustrates an electronic device providing a holoportation service, according to an embodiment.

FIG. 10 illustrates an electronic device providing a holoportation service, according to an embodiment. Specifically, FIG. 10 illustrates a volumetric video call scenario in which the electronic device captures and streams video content for other people to watch in real time.

Referring to FIG. 10, 1031 indicates the one-to-one communication scenario, 1032 indicates a business meeting scenario, 1033 indicates a live concert broadcasting scenario, 1034 indicates a living memory scenario, 1035 indicates an out of body dancing instruction scenario, 1036 indicates a family gathering scenario, 1037 indicates a miniature view scenario, and 1038 indicates a social VR/AR scenario.

Figure 11:
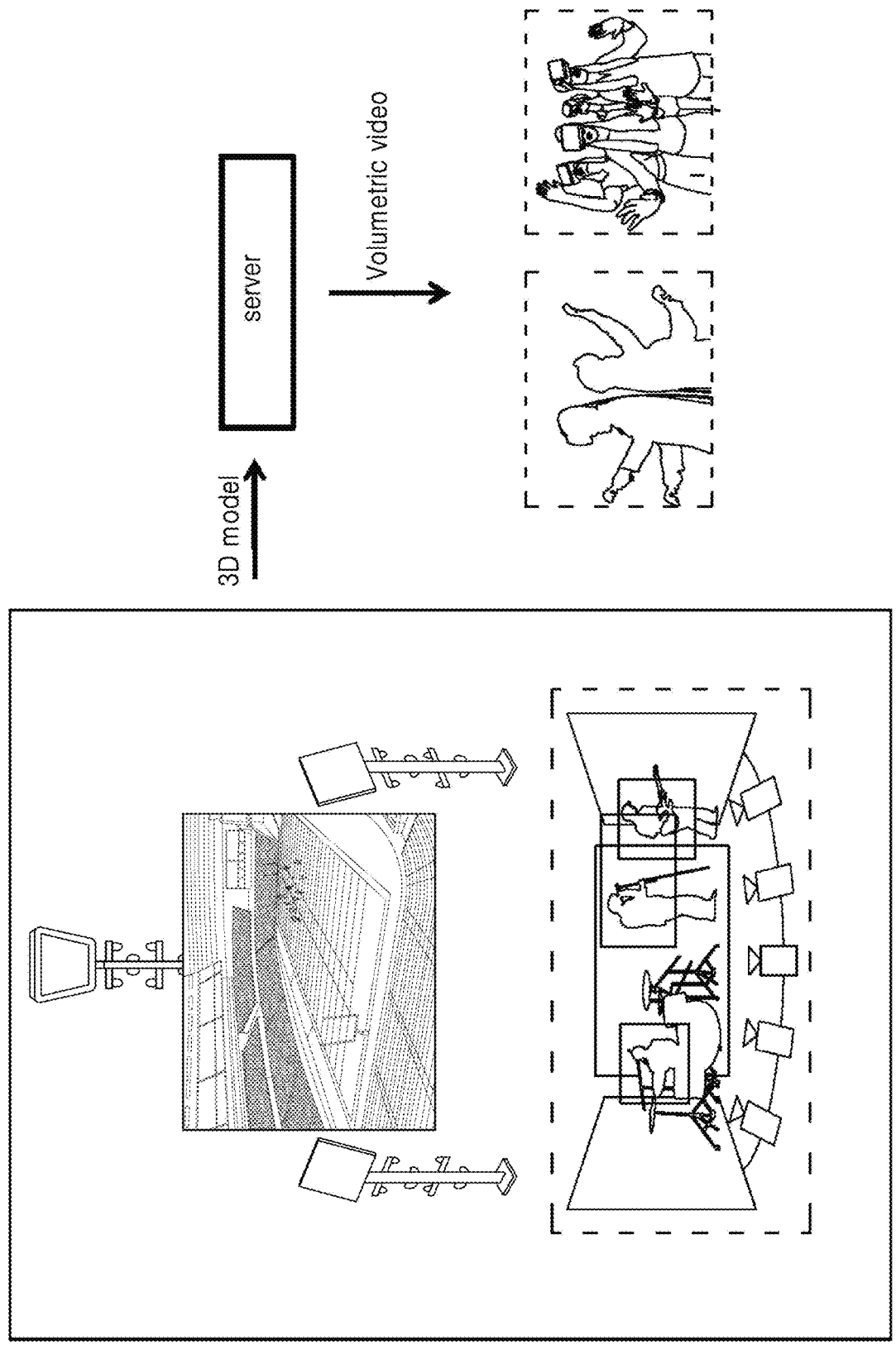
FIG. 11 illustrates an electronic device telecasting live events and broadcasting a service, according to an embodiment.

FIG. 11 illustrates an electronic device telecasting live events and broadcasting a service, according to an embodiment. Specifically, FIG. 11 illustrates recording stadium events like concerts, sports events, etc., as volumetric video and a broadcasting system streaming the volumetric video to the client application executed in the electronic device.

FIG. 12 illustrates an electronic device providing volumetric video for MR based training, according to an embodiment.

Referring to FIG. 12, the electronic device captures an activity (e.g., education training, web session training, etc.). The electronic device compresses and stores the training data in the form of the dynamic 3D models in a server.

Further, the server sends the dynamic 3D models to a client application executed in another electronic device and renders the dynamic 3D models in real time. In the training session, a virtual technician shows how to do something and the user of the electronic device may check all of the operations done by the virtual technician. Accordingly, a user may get clear idea of what exactly is being done by the virtual technician.

The method can also be used in an education and remote support scenario with volumetric content.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of compressing a three-dimensional (3D) object image represented by point cloud data, the method comprising:
    positioning the 3D object image into a plurality of equi-sized cubes for compression, wherein a size of each of the equi-sized cubes is determined based on a maximum value of a color format of the 3D object image, the maximum value of the color format being determined based on a number of bits used by each color channel;
    determining 3D local coordinates in each of the plurality of equi-sized cubes and a cube index for each point of the 3D object image positioned in the plurality of equi-sized cubes;
    generating two-dimensional (2D) image data based on the 3D local coordinates and the cube indexes, wherein the 2D image data includes 2D geometry data, 2D meta data corresponding to the cube indexes, and 2D color data; and
    storing the 2D image data in a memory.

2. The method of claim 1, further comprising:
    receiving the 3D object image including color information and geometry information, wherein the color information includes color coordinates and the geometry information includes global 3D coordinates for the 3D object image, and
    generating the 3D local coordinates transformed from the global 3D coordinates.

3. The method of claim 2, wherein the 2D color data is obtained based on the color coordinates.

4. The method of claim 2, wherein the 2D geometry data is generated based on the 3D local coordinates, and
    wherein the 2D meta data is generated based on the cube indexes.

5. The method of claim 4, wherein the cube indexes are obtained in each of the plurality of equi-sized cubes.

6. The method of claim 1, wherein the color format comprises an RGB color format.

7. The method of claim 1, wherein the 3D object image includes a still image or a moving picture image.

8. An apparatus for compressing a three-dimensional (3D) object image represented by point cloud data, the apparatus comprising:
    a processor configured to:
        position the 3D object image into a plurality of equi-sized cubes for compression, wherein a size of each of the equi-sized cubes is determined based on a maximum value of a color format of the 3D object image, the maximum value of the color format being determined based on a number of bits used by each color channel,
        determine 3D local coordinates in each of the plurality of equi-sized cubes and a cube index for each point of the 3D object image positioned in the plurality of equi-sized cubes, and
        generate two-dimensional (2D) image data based on the 3D local coordinates and the cube indexes, wherein the 2D image data comprises 2D geometry data, 2D meta data corresponding to the cube indexes, and 2D color data; and
    a memory configured to store the 2D image data.

9. The apparatus of claim 8, wherein the processor is further configured to:
    receive the 3D object image including color information and geometry information, wherein the color information includes color coordinates and the geometry information includes global 3D coordinates for the 3D object image, and
    generate the 3D local coordinates transformed from the global 3D coordinates.

10. The apparatus of claim 9, wherein the processor is further configured to obtain the 2D color data based on the color coordinates.

11. The apparatus of claim 9, wherein the processor is further configured to generate 2D geometry data based on the 3D local coordinates and the 2D meta data based on the cube indexes.

12. The apparatus of claim 11, wherein the processor is further configured to obtain the cube indexes in each of the plurality of equi-sized cubes.

13. The apparatus of claim 8, wherein the color format comprises an RGB color format.

14. The apparatus of claim 8, wherein the 3D object image comprises a still image or a moving picture image.

15. A non-transitory computer-readable recording medium having an executable program recorded thereon, wherein the program, when executed by at least one processor, instructs a computer to perform:
    positioning the 3D object image into a plurality of equi-sized cubes for compression, wherein a size of each of the equi-sized cubes is determined based on a maximum value of a color format of the 3D object image, the maximum value of the color format being determined based on a number of bits used by each color channel;
    determining 3D local coordinates in each of the plurality of equi-sized cubes and a cube index for each point of the 3D object image positioned in the plurality of equi-sized cubes;
    generating two-dimensional (2D) image data based on the 3D local coordinates and the cube indexes, wherein the 2D image data comprises 2D geometry data, 2D meta data corresponding to the cube indexes, and 2D color data; and
    storing the 2D image data in a memory.

* * * * *